United States Patent [19]
Wuebker

[11] Patent Number: 5,358,445
[45] Date of Patent: Oct. 25, 1994

[54] VARIABLE ANGLE TORQUE TRANSMITTING COUPLING DEVICE

[75] Inventor: Robert A. Wuebker, Westerville, Ohio

[73] Assignee: General Signal Corporation, Stamford, Conn.

[21] Appl. No.: 113,584

[22] Filed: Aug. 27, 1993

Related U.S. Application Data

[63] Continuation of Ser. No. 653,870, Feb. 14, 1991, abandoned, which is a continuation-in-part of Ser. No. 494,010, Mar. 15, 1990, abandoned.

[51] Int. Cl.⁵ ............................................. F16D 3/20
[52] U.S. Cl. ................................... 464/112; 403/154; 464/120
[58] Field of Search ............... 464/110, 112, 102, 106, 464/120, 130; 403/152, 146, 138, 154, 155

[56] References Cited

U.S. PATENT DOCUMENTS

| | | | |
|---|---|---|---|
| 259,399 | 6/1882 | Johnston | 464/112 |
| 1,128,432 | 2/1915 | Fetzer | 464/110 X |
| 1,685,446 | 9/1928 | Benedict | 464/120 |
| 1,988,967 | 1/1935 | Emrick | 464/112 X |
| 2,305,696 | 9/1941 | Healy | 464/110 |
| 2,324,700 | 7/1943 | healy | 464/110 |
| 3,167,934 | 2/1965 | Fenwick | 464/110 |
| 3,229,481 | 1/1966 | Dunn | 464/110 |
| 4,188,801 | 2/1980 | Hugh et al. | 464/106 |
| 4,274,268 | 6/1981 | Taig | 464/110 |
| 4,317,338 | 3/1982 | Jordan | 464/110 |
| 4,395,246 | 7/1983 | Taig et al. | 464/110 X |
| 4,540,383 | 9/1985 | Taig | 464/110 |
| 4,643,699 | 2/1987 | Taig | 464/112 |
| 4,685,897 | 8/1987 | Krude | 464/112 X |
| 4,886,480 | 12/1989 | Lutz | 464/112 |

FOREIGN PATENT DOCUMENTS

| | | |
|---|---|---|
| 648973 | 5/1934 | Fed. Rep. of Germany . |
| 1098297 | 12/1958 | Fed. Rep. of Germany . |
| 3028455 | 3/1982 | Fed. Rep. of Germany . |
| 1307816 | 12/1961 | France . |
| 550579 | 1/1948 | United Kingdom . |
| 942252 | 11/1963 | United Kingdom . |
| 1097334 | 3/1968 | United Kingdom . |
| 2114267 | 8/1983 | United Kingdom . |

OTHER PUBLICATIONS

Machine Design, Oct. 15, 1987, pp. 76–84.

*Primary Examiner*—Daniel P. Stodola
*Assistant Examiner*—Eileen A. Dunn
*Attorney, Agent, or Firm*—Milton E. Kleinman; Robert R. Hubbard; Robert S. Smith

[57] ABSTRACT

A variable angle torque transmitting coupling apparatus for use in an automobile steering column as well as other applications which includes a first member which is generally T-shaped and has an elongated shaft and an elongated head each having an axis. The respective axes thereof are disposed substantially at a right angles. A second member includes a housing in which an elongated slot is disposed, the slot is dimensioned and configured for receiving the head of the first member. The head has side surfaces which are cylindrical section shaped and the sides of the slot are dimensioned and configured for receiving the head. The slot has a generally planar bearing surfaces on the sides thereof which engage the cylindrical section shaped surfaces of the head with sliding engagement therebetween. The head has surfaces at the axial extremities thereof which are spherical section shaped and which slidingly engage spherical section shaped members.

20 Claims, 3 Drawing Sheets

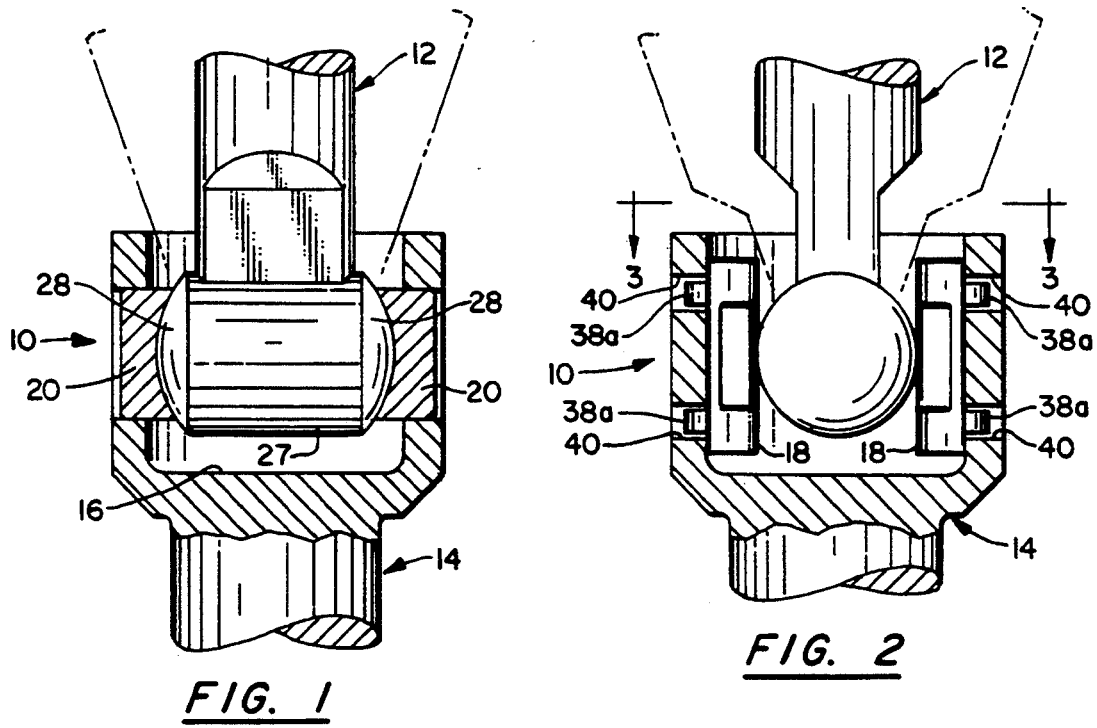
FIG. 1
FIG. 2
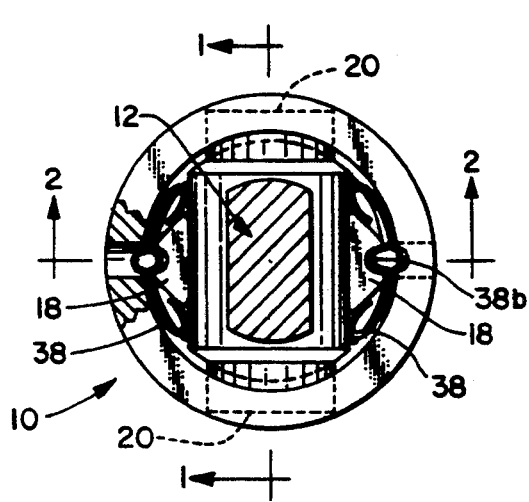
FIG. 3
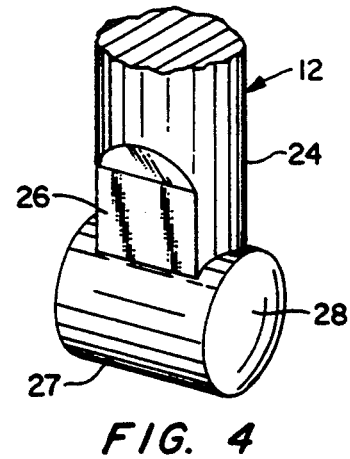
FIG. 4
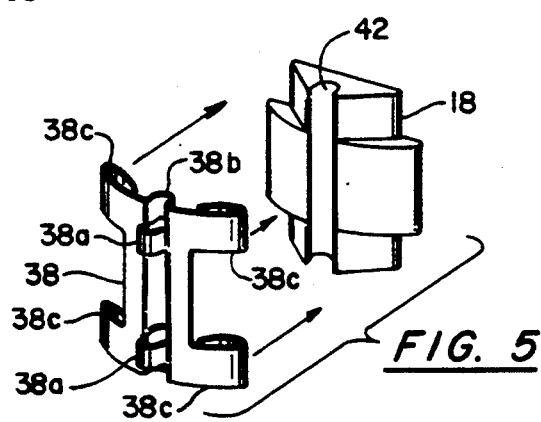
FIG. 5

VARIABLE ANGLE TORQUE TRANSMITTING COUPLING DEVICE

RELATED APPLICATIONS

This is a continuation of application Ser. No. 07/653,870 filed on Feb. 14, 1991 which was a continuation-in-part of United States Patent Application Ser. No. 07/494,010 filed Mar. 15, 1990, both now abandoned.

BACKGROUND OF THE INVENTION

The invention relates to a torque transmitting apparatus intended for coupling two misaligned shafts. More particular, the present invention relates to a non-constant velocity torque transmitting device or coupling although it will be understood by those skilled in the art that with various modifications the coupling in accordance with the invention could be a constant velocity joint. A very common example of such a torque transmitting device is the universal joint typically disposed at the axial extremities of an automobile drive shaft. Many other variable angle torque transmitting devices are known. If there is no misalignment of the shafts then it is easy to use flanges on the respective shafts that are bolted together.

Coupling apparatus which permits the tilting or transmission of torque between two shafts which are disposed at a fixed angle or a varying angle are also well known. In some case the requirement to transmit torque between angle shafts may occur because of space limitation. Apparatus of known types includes Cardan Joints which have two yokes which cooperate with a cross assembly. This is the construction commonly utilized for automobile universal joints.

Other well known designs are known as constant velocity joints because the input and output shafts maintain the same angular velocity through out each rotation of the respective shafts. Constant velocity joints are in general more complex and more expensive than joints which do not have this construction. The non-constant velocity joints are typically limited in operating speed because of the velocity fluctuation. The prior art non-constant joints include slipper couplings, ball joints, so called aircraft joints and ball and trunnion joints. Known constant velocity U-joints include Rzeppa, Tripot, Weiss and Tracta.

Still other known couplings shear couplings in which two facing plates are capped and joined with a resilient angular element shaped and constructed like an automobile tire. Other elastomeric flex members include so called rubber block constructions and flexible sleeve couplings which utilize two flanges with internal teeth that engaged a flexible sleeve with external teeth. Others include a rubber block construction and a compression construction. Flexible coupling constructions includes spring, Schmidt and silent chain constructions. Still other constructions utilize flexible disks, plastic chains and sliding disks. The prior art also includes the apparatus described in U.S. Pat. No. 3,081,114 which shows a cylindrical section shaped surface retained in a cylindrical section shaped cavity.

U.S. Pat. No. 1,143,571 shows a universal joint with a casing having a spherical socket. The socket receives a ribbed shaft extremity.

U.S. Pat. No. 2,109,935 shows a coupling having a driving member and a driven member each having recesses. Bearing blocks are disposed in the recesses and contact the outer surface of the other member to transmit power from one member to the other member.

U.S. Pat. No. 3,587,249 shows a universal joint with a driving ball mounted on a shaft which is received in a hemispherical shell. A projection on the driving ball enters a groove in the shell to permit a transmission of torque when the respective shafts are at angles with respect to each other.

The prior art apparatus in general has been much more complex than it is desirable and in many cases has been constructed in a manner that was relative large for a given amount of torque transmission. Some of these apparatus are very difficult to rebuild and thus must be replaced in their entirety and accordingly are relatively expensive.

As noted above, the non-constant angular velocity joints are limited with respect to the speed at which they can be operated because of the effects of angular velocity changes. Many of the earlier apparatus are also severely limited with respect to the angles which can be tolerated between the respective shafts.

It is an object of the invention to provide an angular torque transmission joint that is relatively small in size with relatively high torque transmitting capability and which will be suitable for use on automobile tilt steering columns as well as other torque transmission couplings such as between motors and pumps, drive shafts for automobiles and other applications.

It is yet another object to the invention to provide a joint that may be easily manufactured.

SUMMARY OF THE INVENTION

It has now been found that these and other objects of the invention may be attained in a variable angle torque transmitting coupling apparatus for use on an automobile steering column or other torque transmitting apparatus which includes a first member which is generally T-shaped and has an elongated shaft and an elongated head each having an axis. The respective axes thereof are disposed at substantially right angles. A second member includes a housing in which an elongated slot is disposed, the slot is dimensioned and configured for receiving the head of the first member.

This embodiment of the apparatus in accordance with the invention may have a head with side surfaces which are cylindrical section shaped. The slot may have generally planar bearing surfaces on the side thereof which engage the cylindrical section shaped surfaces of the head with sliding engagement therebetween.

The head may have surfaces at the axial extremities thereof which are spherical section shaped. The slot may have a spherical section shaped bearing surfaces at the ends thereof dimensioned and configured for engaging the spherical section shaped surfaces of the head for sliding engagement.

The apparatus may support the generally planar bearing surfaces with at least one spring which may be a leaf spring. Each of the leaf springs has at least a portion thereof which is generally U-shaped. The leaf springs include at least one protrusion for engaging the generally planar bearing surfaces. In some embodiments each of the leaf springs include at least one protrusion for engaging the slot.

In some forms of the invention a ring shaped spring may urge two or even four bearings against the T-shaped head.

BRIEF DESCRIPTION OF THE DRAWING

The invention will be better understood by reference to the accompanying drawing in which:

FIG. 1 is a partially sectional view taken along the line 1—1 of FIG. 3.

FIG. 2 is a partially sectional view taken along the line 2—2 of FIG. 3.

FIG. 3 is a top view in partial section of the coupling in accordance with one form of the invention.

FIG. 4 is a perspective view of the T-shaped member that is one of the two primary parts of the coupling.

FIG. 5 is an exploded perspective view of one of the flat faced torque bearings, that cooperate with the cylindrical surface of the T-shaped member, and the spring that retains that bearing.

DESCRIPTION OF THE PREFERRED EMBODIMENT

Figure 10:
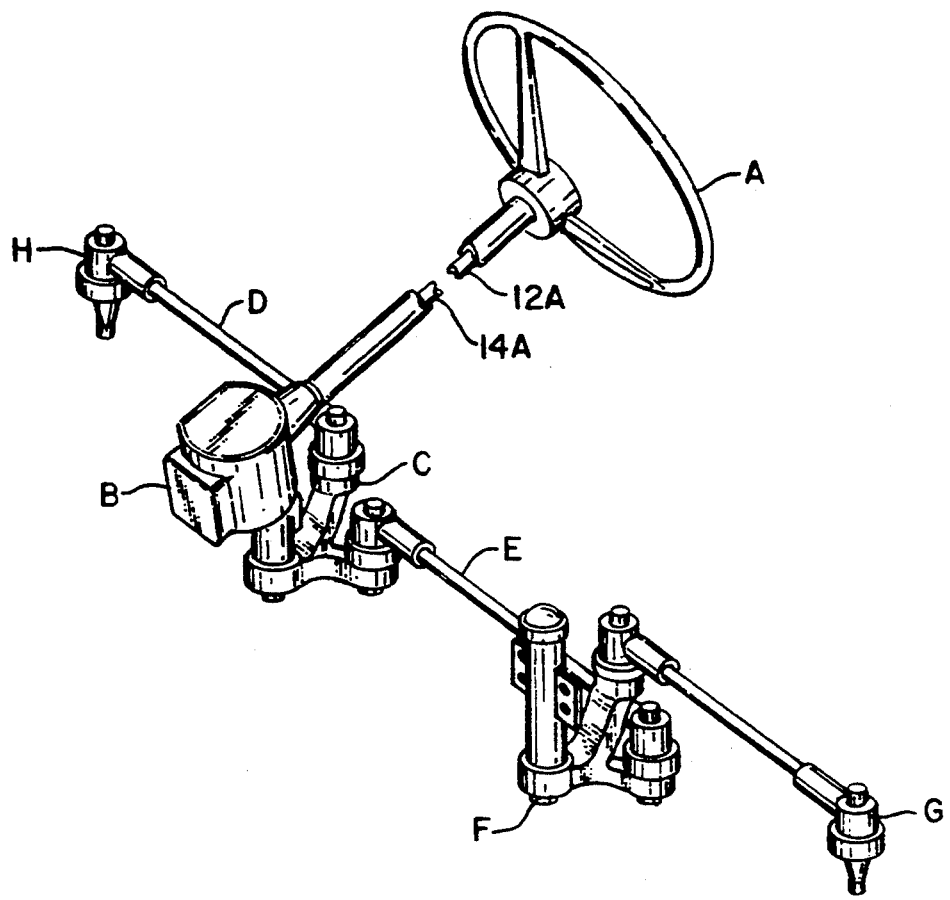
FIG. 10 is a perspective view of a prior art steering assembly in which the present invention may advantageously be utilized.

Referring now to FIGS. 1–5 and 10 there is shown a variable angle torque transmitting coupling device 10 in accordance with one form of the invention. The variable angle torque transmitting coupling device 10 includes a T-shaped member 12 and a column 14. One form of the prior art steering mechanism in which the invention may be used is shown in FIG. 10. It will be understood that the T-shaped member 12 will ordinarily be fixed to the axial portion 12A of the steering column and the column 14 will ordinarily be fixed to the axial portion 14A of the steering column. In the conventional manner the axial portion 12A is fixed to a steering wheel A. The lower axial portion 14A cooperates with a steering box B that in turn cooperates with a pitman arm C. A tie rods E cooperates with an idler arm F and a ball joint G. Similarly, a steering rod D cooperates with the pitman arm C and a ball joint H.

The column 14 is provided with a slot shaped recess 16 in which are disposed a first flat faced torque bearing 18 and a second opposed flat faced torque bearing 18 as best shown in FIG. 2. Also disposed in the in slot shaped recess 16 is a first spherical face bearing 20 and a second opposed spherical face bearing 20. It will be understood that successive sides of the slot shaped recess 16 have a first flat faced torque bearing 18, a first spherical face bearing 20, a second flat faced torque bearing 18 and a second spherical face bearing 20.

Disposed in the slot shaped recess 16 is the T-shaped member 12. The T-shaped member 12 includes a shaft 24 having a relief 26 to allow clearance with respect to the slot shaped recess 16. The T-shaped member 12 includes a cylindrical head 27 having a first axial extremity which is a spherical face bearing 20 and a second axial extremity which is a second spherical face bearing 20. The respective first and second spherical face bearings 20 engage the first and second spherical bearing surfaces 28, 28.

As best seen in FIG. 5 the flat faced torque bearings 18, 18 are each retained by respective leaf springs 38, 38. Each leaf spring 38 includes two projections 38a which engage respective passageways 40, 40 in the side wall of column 14 as best seen in FIG. 2. In a similar manner the spring 38 has a rib 38b that engages a slot 42 in the flat faced torque bearing 18 to maintain the position of the flat faced torque bearing 18 against the cylindrical head 27 as best seen in FIG. 2 and FIG. 3.

The spring 38 further includes four resilient protrusions or arms 38c that engage the back of the associated flat faced torque bearing 18. As best seen in FIG. 5, each of the arms 38c are disposed in side abutting relationship to one of two raised locating surfaces 18a disposed on the back of flat faced torque bearing 18 adjacent to the groove 42 as best seen in FIG. 5. The location of the flat faced torque bearings 18 are thus maintained during the operation of the variable angle torque transmitting coupling device 10. More specifically, the spring 38 provides compensation and tolerance compensation. At least a part of each spring 38 has a generally U-shaped cross section.

In various embodiments of the invention the torque bearings 18, 18 may be various metals or they may be plastic or other materials. For light duty applications the bearing 18 may, for example, be nylon and such a bearing may be supported by a spring such as spring 38 or may merely rely on the elasticity of the nylon or other somewhat pliable member to provide the desired wear and tolerance compensation.

It will thus be seen that a torque applied to the shaft 24 is transmitted to the cylindrical head 27 which rides between two flat faced torque bearings 18 carried in the slot shaped recess 16 in the column 14. Accordingly, the torque is transmitted to the column 14. Conversely, a torque applied to the shaft 24 of the T-shaped member 12 will be transmitted will be transferred to the two flat faced torque bearings 18 and thus to the column 14.

Figure 6:
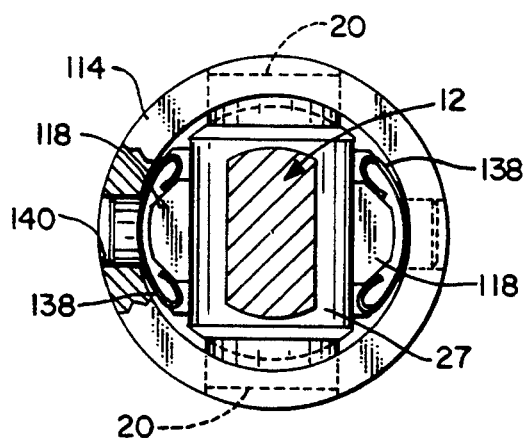
FIG. 6 is a top view in partial section of a second embodiment of the coupling in accordance with one form of the invention.
Figure 7:
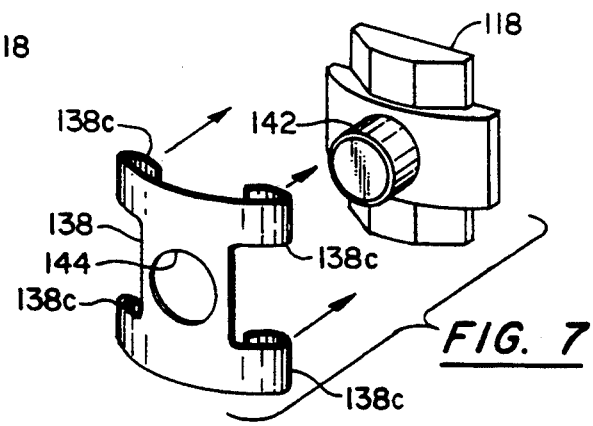
FIG. 7 is an exploded perspective view of a portion of the second embodiment showing one of the flat faced torque bearings, that cooperate with the cylindrical surface of the T-shaped member, and the spring that retains that bearing.

Referring now to FIGS. 6–7 there is shown a second embodiment of the apparatus in accordance with the invention. Elements of this embodiment that are the same are identified by the same reference numerals. In this embodiment the flat faced torque bearing 118 is provided with a boss 142 projecting form the opposite face. The boss is dimensioned and configured to pass through a hole 144 in the leaf spring. The boss 142 also engages a hole 140 in the column 114. The spring 138 is provided with elements 138c that are substantially the same as the elements 38c in the first embodiment. It will be understood that the hole 144 in the spring 138 is aligned with the hole 140 in the assembled apparatus.

Figure 8:
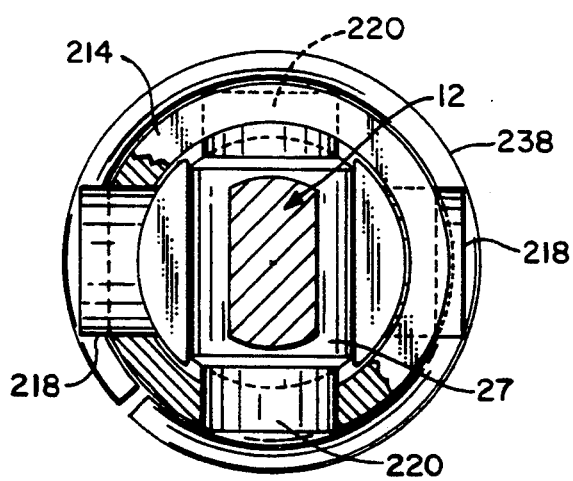
FIG. 8 is a top view in partial section of a third embodiment of the coupling in accordance with one form of the invention.
Figure 9:
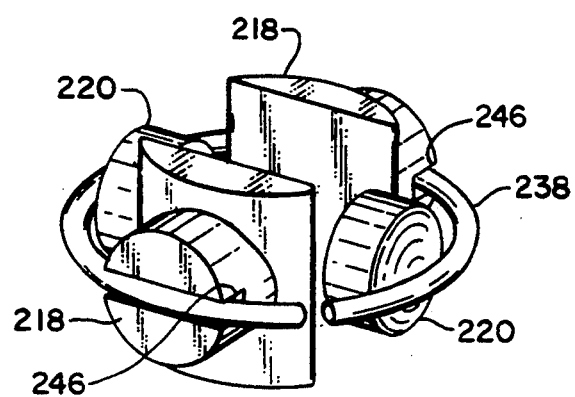
FIG. 9 is an exploded perspective view of a portion of the third embodiment showing two of the flat faced torque bearings, that cooperate with the cylindrical surface of the T-shaped member and the bearings that cooperate with the spherical section shaped ends of the T-shaped member, and the hoop shaped spring that retains the bearings.

Referring now to FIGS. 8–9 there is shown a third embodiment of the invention in which a ring shaped spring 238 holds the bearings 218, 218, 220, 220 against the T-shaped member 12. The bearings 220, 220 have a convex face on the side facing the column 14 and a concave face which cooperates with the spherical bearing surfaces 28 of the T-shaped member 12. In various forms of the invention the convex face may be either a spherical or cylindrical section. The bearings 218, 218 each include a slotted boss 246 that cooperates with the ring shaped spring 238. The flat faced bearings 218, 218 cooperate with the cylindrical sides of the head 27. The slotted bosses 246, 246 engage holes 140, 140 as in the embodiment of FIGS. 6–7.

It will thus be seen that various forms of the springs and bearings may be utilized in various forms of the invention.

The invention has been described with reference to its illustrated preferred embodiment. Persons skilled in the art of couplings may upon exposure to the teachings herein, conceive other variations. Such variations are deemed to be encompassed by the disclosure, the invention being delimited only by the appended claims.

Having thus described my invention I claim:

1. A variable angle torque transmitting coupling apparatus which comprises:
    a first member which is generally T-shaped and includes an elongated shaft having a length that is greater than the width thereof and an elongated cylindrical head having a length greater than the width thereof, said head and said shaft each having an axis, the respective axes thereof being disposed substantially at a right angle in a first plane, the first plane being perpendicular to a second plane in which the entire extent of the axis of said shaft is disposed, the maximum dimension of said head in said first plane being greater than the maximum dimension of said head in said second plane, said elongated cylindrical head having surfaces at the axial extremities thereof which are spherical section shaped, all other surfaces of said head being cylindrical section shaped; and
    a second member having a housing in which an elongated first slot is disposed, said first slot being dimensioned and configured for receiving said head of said first member, first and second bearing elements having generally planar bearing surfaces disposed in said first slot on the sides thereof, said first and second bearing surfaces being dimensioned and configured to engage said cylindrical section shaped surfaces of said head with sliding engagement in all possible positions of said first and second members.

2. The apparatus as described in claim 1 further including:
    first and second inserts having spherical section shape bearing surfaces disposed at respective ends of said first slot, said first and second spherical section shaped bearing surfaces being dimensioned and configured for engaging said spherical section shaped surfaces of said head for sliding engagement.

3. The apparatus as described in claim 2 wherein:
    said apparatus further includes first and second springs and said first and second generally planar bearing surfaces are respectively supported within said first slot of said second member by the respective first and second springs.

4. The apparatus as described in claim 3 wherein: each of said springs is a leaf spring.

5. The apparatus as described in claim 4 wherein: each of said leaf springs has at least a portion thereof which is generally U-shaped.

6. The apparatus as described in claim 5 wherein: each of said generally planar bearing elements has an opposed face and each of said leaf springs includes at least one protrusion for engaging a respective one of said opposed faces of said generally planar bearing elements.

7. The apparatus as described in claim 6 wherein: each of said leaf springs includes at least one protrusion for engaging said first slot.

8. The apparatus as described in claim 4 wherein: each of said leaf springs includes at least one protrusion for engaging said first slot.

9. The apparatus as described in claim 4 wherein each of said
    each of said leaf springs include means for locating said spring with respect to said generally planar bearing surfaces 10. The apparatus as described in claim 2 further including:
    means for mounting said generally planar surfaces resiliently.

11. The apparatus as described in claim 2 wherein: said generally planar surfaces are resiliently biased.

12. The apparatus as described in claim 2 wherein: said generally planar bearing surfaces are collectively supported by a single spring.

13. The apparatus as described in claim 12 wherein: said single spring is a ring shaped spring.

14. The apparatus as described in claim 13 wherein: each of said generally planar bearing elements has an opposed face and each of said generally planar bearing elements include means for coupling said generally planar bearing elements to said ring shaped spring.

15. The apparatus as described in claim 14 wherein: said means for coupling includes a second slot for receiving said ring shaped spring.

16. The apparatus as described in claim 15 wherein: said means for coupling includes a boss and said second slot is disposed in said boss.

17. The apparatus as described in claim 16 wherein: each of said inserts includes a rear face and said ring shaped spring also engages said rear face of said spherical shaped bearing surfaces.

18. A variable angle torque transmitting coupling apparatus which comprises:
    a first member which is generally T-shaped and includes an elongated shaft having a length that is greater than the width thereof and an elongated cylindrical head having a length greater than the width thereof, said head and said shaft each having an axis, the respective axes thereof being disposed substantially at a right angle in a first plane, the first plane being perpendicular to a second plane in which the entire extent of the axis of said shaft is disposed, the maximum dimension of said head in said first plane being greater than the maximum dimension of said head in said second plane, said elongated cylindrical head having surfaces at the axial extremities thereof which are spherical section shaped, all other surfaces of said head being cylindrical section shaped;
    a second member having a housing in which an elongated first slot is disposed, said first slot being dimensioned and configured for receiving said head of said first member, first and second bearing elements having generally planar bearing surfaces disposed in said first slot on the sides thereof, said first and second bearing surfaces being dimensioned and configured to engage said cylindrical section shaped surfaces of said head with sliding engagement in all possible positions of said first and second members, and means for coupling one of said members to an associated steering wheel and means for coupling the other of said members to an associated automobile steering linkage.

19. The apparatus as described in claim 18 further inlcuding:

first and second inserts having spherical section shape bearing surfaces disposed at respective ends of said first slot, said first and second spherical section shaped bearing surfaces being dimensioned and configured for engaging said spherical section shaped surfaces of said head for sliding engagement.

20. The apparatus as described in claim 19 wherein:

said apparatus further includes first and second springs and said first and second generally planar bearing surfaces are respectively supported within said first slot of said second member by the respective first and second springs.

* * * * *